June 15, 1937.   B. BRONSON   2,084,015
AUTOMOBILE RUNNING BOARD COVER SECURING DEVICE
Filed May 4, 1934   2 Sheets-Sheet 1

INVENTOR
Budd Bronson
BY Justin W. Macklin
ATTORNEY

June 15, 1937.  B. BRONSON  2,084,015
AUTOMOBILE RUNNING BOARD COVER SECURING DEVICE
Filed May 4, 1934  2 Sheets-Sheet 2

Inventor
Budel Bronson
By Justin W. Macklin
Attorney

Patented June 15, 1937

2,084,015

UNITED STATES PATENT OFFICE 2,084,015

AUTOMOBILE RUNNING BOARD COVER SECURING DEVICE

Budd Bronson, Cleveland, Ohio, assignor to The Ohio Rubber Company, Willoughby, Ohio, a corporation of Ohio Application May 4, 1934, Serial No. 723,951

4 Claims. (Cl. 280—169)

This invention relates to coverings for automobile running boards and the like, and means for attaching the covering to the usual pressed metal or sheet metal board. The invention relates to subject matter similar to that of my prior application No. 678,855, filed July 3, 1933, for "Flexible covering for automobile running boards", and to which application reference may be had for a discussion of the prior methods of attaching running board covering material. Many of the objects here attained are there fully set forth.

Briefly, the present generally used methods include applying the sheet rubber or like covering to the previously formed running board by cementing, and also the process of vulcanizing the sheet to the steel running board, in the rubber plant. In the latter case the metal running boards must be shipped to the rubber molding plant, from which the boards with the covers vulcanized or molded thereon are then shipped to the automobile plant. Expensive equipment, shipment and reshipment to and from the rubber applying plant, are eliminated by this invention, as well as that of my prior application above referred to.

Briefly, the general object of the present invention is to provide a means for quickly attaching a flexible covering to a previously formed running board with a minimum of expense, while attaining convenience in attachment and detachment at the automobile plant or other place of assembly.

A further object is to so form such a covering and provide attaching devices such that, when applied, the covering may be very securely held to the running board throughout the life of the cover, and preferably held under tension toward the running board body or plate, as well as having the parts of the covering under lateral tension parallel with the surface of the board throughout the life of its use. More specific objects of this invention are to make cheap, efficient attaching means capable of being conveniently formed with the rubber covering and providing securing devices or elements projecting therefrom adapted to engage the board through openings or recesses or slots or the like provided therein.

A still further specific object is to provide a form of attaching device which needs no special tool, or at least no expensive tools for assembling the running board onto the cover.

In the drawings Fig. 1 is a plan view showing a running board, with the cover partly cut away, embodying one form of my invention.

Figure 6:
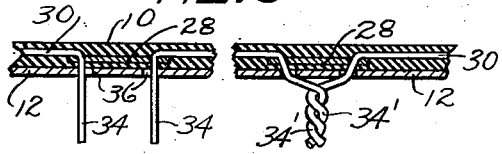

Fig. 6 comprises two fragmentary sectional views showing the method of assembly of the wires and running board.

Figure 5:
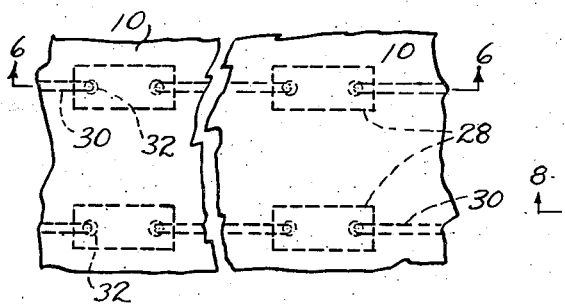
Fig. 5 is a fragmentary view of a modified form of the invention similar to that of one of the forms of my above mentioned prior application embodying wires, but with connecting plates preferably molded into the rubber.
Figure 7:
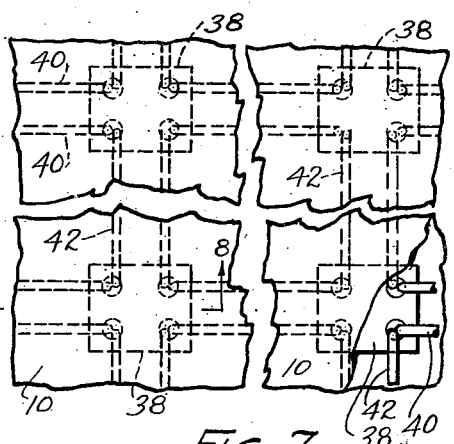
Figure 8:

Figs. 7 and 8 are further modifications similar to Figs. 5 and 6, being fragmentary plan and sectional views, respectively, showing the method of securing the wires.

Figure 9:
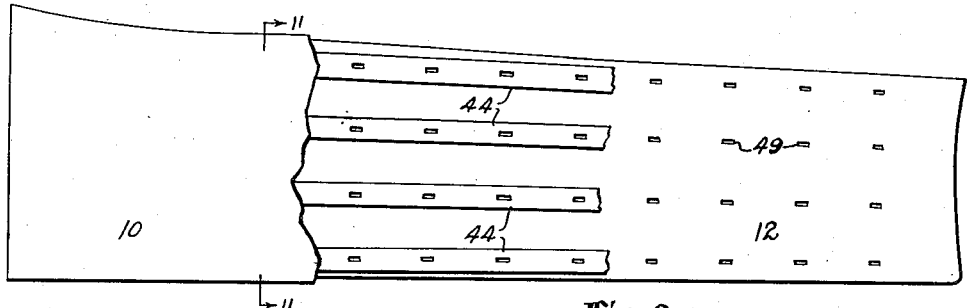

Fig. 9 is a plan view of a running board with the covers and strips partly cut away, and showing a slightly different arrangement of securing means.

Figure 10:
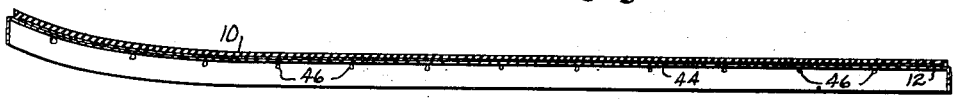

Fig. 10 is a longitudinal section of the running board shown in Fig. 9.

Figure 11:
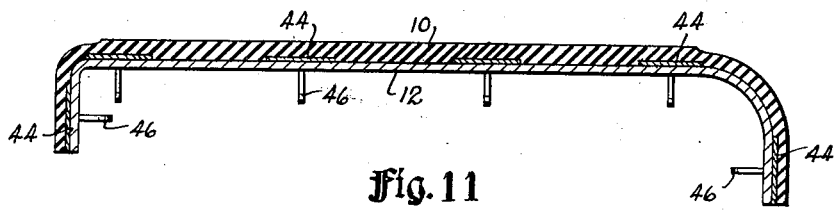

Fig. 11 is an enlarged transverse section taken on line 11—11 of Fig. 9.

Figure 12:
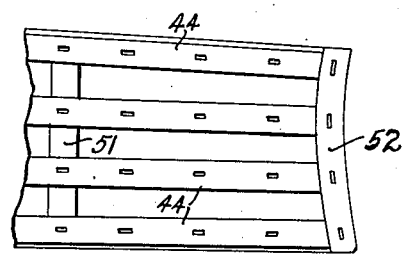

Fig. 12 is a fragmentary plan view showing a portion of the cover with a slightly different arrangement of strips, the cover being shown flat before application to the running board.

Figure 13:
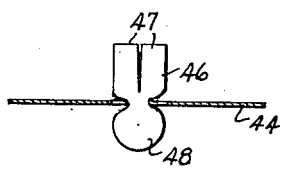
Figure 14:
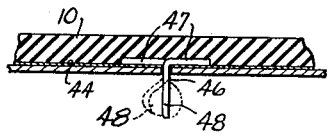

Figs. 13 and 14 are details of another form of fastening device extending through the strips and into the running board.

Figure 1:
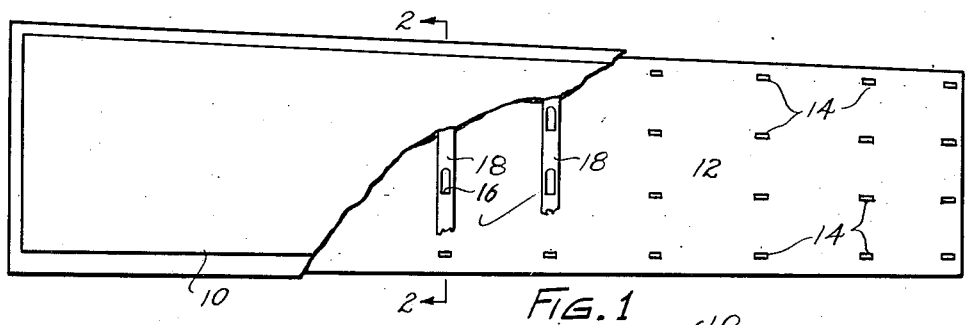
Figure 2:
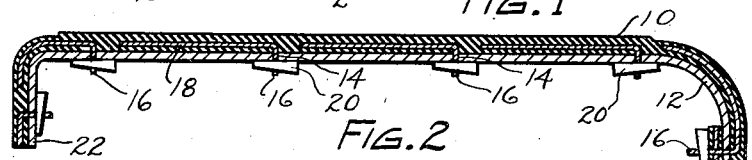
Fig. 2 is a transverse section taken as indicated by the line 2—2 of Fig. 1 on a somewhat enlarged scale.

Referring first to the form shown in Figs. 1 and 2, the running board cover or covering is indicated at 10, and is here shown as overlying the substantially flat surface of the step portion of the running board 12, while extending downwardly over the inside flange 22 of the board, that is, the flange toward the automobile, while at the outer flange it is shown as extending downwardly and then turned upwardly beneath and inside of the outer flange as at the right of Fig. 2.

The running board itself is shown as provided with apertures or slots punched or otherwise formed therein, as indicated at 14. Molded into the rubber or otherwise embedded therein and secured thereto I have shown, in this form, a series of transverse strips of metal 18, from which are punched or severed tongues 16 adapted to pass through the apertures 14. In this form these tongues are also provided with openings to receive wedges 20 which when firmly forced into the position shown in Fig. 2 tightly draw the strips 18, and correspondingly the cover, toward the running board and force the covering material into tight overlying engagement, and, incidentally, effect a tension of the rubber against the running board throughout the life of the covering.

In my prior application above referred to, the method of molding the covering, which may be of rubber, rubber composition, or other like material, forming it flat and embedding in it as in the former case, wires or the like, is described in detail, and a similar method may be used for forming, molding, and vulcanizing the covering with the strips 18 embedded therein and the tongues 16 projecting laterally from the inside thereof. A permanent curvature may be given to the rubber, as by allowing cooling on a suitable form, so that it may more readily fit without undue tension over the curves and corners at the front and inside flanges.

Any suitable molding means or methods may be employed whereby the reinforcing strips and securing members may be embedded in or otherwise vulcanized to the covering material, it being essential however that the securing tongues or ears project laterally from the covering and that they are spaced to register with and enter the apertures 14 of the running board.

Referring to the arrangement at the right of Fig. 2, if it is desired to turn the rubber covering upwardly beneath the flange, an opening through it may be caused to register with the outermost tongue 16 when it is so turned, so that the wedge 20 may press the inner and outer embracing portions of the covering against the flange of the metal running board.

Figure 3:
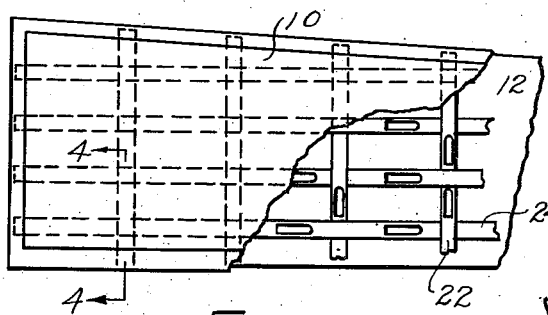
Fig. 3 is a fragmentary view similar to that of Fig. 1 in a slightly modified form.
Figure 4:
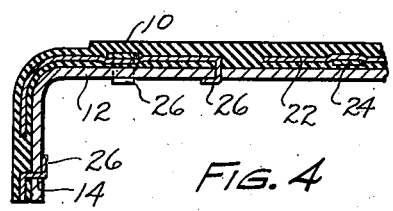
Fig. 4 is a fragmentary sectional view, similar to Fig. 2, of construction illustrated in the form of Fig. 3.

In the slightly modified form of Figs. 3 and 4, I may run the securing elements or strips both ways, that is, longitudinally and transversely of the covering material. In such instances the cover is molded, vulcanized to, or embedded therein. Strips 22 correspond to the strips 18, and strips 24 preferably alternately interwoven or interlaced therewith, there being a slight offset in one or more strips at the points of crossing, as indicated in Fig. 4. In this instance the tongues 26 may be provided with openings for the wedges, or as illustrative of another method of attachment, they may be turned tightly against the running board metal after having been passed through the apertures 14.

As a feature quite closely related to the construction of my aforementioned application, the transverse and longitudinal securing elements are in the form of narrow strips or wires. In the present form certain improvements are accomplished. The individual sections of wire, here designated at 30, may be connected by plates 28. The plates 28 having openings therethrough may receive the laterally turned ends of the wires 30, so that in assembly a group of these wires or plates may form a net or mesh and may be conveniently applied to the rubber to form the covering during molding operation.

An improved result is that when the ends 34 of the wires 30 are extended through the apertures 36 in the running board and are twisted or otherwise secured to tightly draw upon the covering, holding it not only against the running board but creating tension in longitudinal or transverse, or both directions on the rubber, there is no tendency to depress or otherwise distort the rubber 10 at the point above the twisted ends 34', shown at the right of Fig. 6.

As further illustrating the mesh or net, which may be previously assembled and applied to the rubber to be molded to form the covering, and showing the arrangement of wires both transversely and longitudinally, the fragmentary views of Fig. 7 illustrate suitably spaced metal plates 38. These are preferably one inch or more in size, and have four openings, each large enough so that two of the wires 40 and 42 may have their downturned ends projecting through one opening in the plates 38 and through corresponding apertures in the running board itself. In this case the transverse wires 42 have their ends twisted or otherwise secured together and subjected to tension, as shown in Fig. 8, while the longitudinal wires 40 are correspondingly treated. Here as before these plates 38 may be spaced a few inches apart, the view of Fig. 7 being shown in fragmentary form to indicate that the spacing may be made to suit the conditions. For example, at the point of greatest wear on the running board the wires and plates may be closer together, while the transverse wires may be placed further apart, at other portions of the running board.

The method of securing the projections which extend through the apertures of the running board in any of the forms shown obviously may be varied to suit conditions, for example, in Figs. 1 and 2 I have shown wedges and the turned over ends engaging the underside of the running board. These tongues or like projections, for example, may be notched at one or both sides, so that the notches would stand opposite the edges of the slots 14 and in the plane of the board and the lower ends of the tongues may be turned to effect a secure fastening. Without notching such tongues, an actual distortion of the tongue by twisting it to stand across the slot or aperture such as 14 may effect suitable securing tension.

In the form of the running board shown in Figs. 9, 10 and 11, the cross strips 22 are omitted and a plurality of longitudinal strips 44 are imbedded in the lower surface of the flat sheet, the separate fastening units such as shown in Figs. 13 and 14 having been first inserted in the strips 44. By the term "imbedded" I mean that the rubber of the cover 10 may entirely surround the strips or securing means, although, here as in connection with the other structures described, the rubber may embrace the top, side and edges of the strips and extend underneath only as "flash" or pressure flow would cause it to do. For example, in the case of wires, they might be laid upon the bottom of the mold and the rubber sheet of the running board laid upon the top of them and the imbedding caused by merely pressing the wires and the rubber sheet together, forcing the wires into the sheet and forcing the rubber of the sheet sufficiently under the wires to partially envelop them. In case of a strip, however, the rubber may be caused to adhere to the strip which conforms thereto, and the rubber may or may not flow underneath the strip to any substantial amount.

In Fig. 12 I have shown a cover having cross strips, and having a smaller number, namely four instead of six, longitudinal strips. This view illustrates the appearance of the cover after molding and before application of the cover to the running board. While in the preferred construction the cover is formed flat or substantially flat, it should be understood, however, that if the rubber of the cover is of such composition as to require it, the curvature may be preformed or partially preformed at the outside and inner edges.

The form of clip shown in Figs. 13 and 14 is constructed as a single flat piece of metal 46 having its upper portion split, forming tongues 47 and having inward intermediate notches and a lower tongue or projection 48 adapted to extend through slots 49 in the running board. When the cover is assembled, the projections 48 are passed through the openings 49 and may be locked in position by bending or twisting, the intermediate notches being so shaped as to provide a wedging action with the sheet metal running board exerting a strong downward pull on the strips and correspondingly upon the running board material. A convenient way of assembly is to insert the clips first in the strips, turning over the tongues 47, imbedding or enveloping them in the rubber covering material and allowing them to project from the lower side thereof.

The form of cover shown in Fig. 9, which has only longitudinal strips is capable of greater lateral or transverse flexibility and elasticity than the form of cover having transverse or cross strips. However, cross strips as indicated at 51 in Fig. 12 may be used as in the other forms, and where they are employed the fasteners or securing means pass through apertures located at the intersections of the longitudinal and cross or end strips. In any case the end or cross strips indicated at 52 may or may not be used. While a preferred form of clip has been illustrated and described in detail, it should be understood that the invention is not limited to these details or to this type of clip, but that the use of other styles of clips is contemplated.

As to various details and features of the several modifications, I do not wish to be limited, except as to structures within the scope of the appended claims, inasmuch as various modifications and alterations may be made within the spirit and scope of my invention.

Having thus described my invention, I claim:

1. A running board cover flexible throughout comprising a sheet of rubber having molded and embedded therein a reinforcing means formed of spaced metal plates and wires connecting adjacent plates with each other.

2. A running board cover flexible throughout comprising an elongated sheet of rubber having a net-like reinforcing means molded and embedded therein, such reinforcing means being formed of spaced metal plates and wires extending longitudinally and transversely of the sheet and connecting the adjacent plates with each other.

3. A running board cover flexible throughout comprising an elongated sheet of rubber having a net-like reinforcing and attaching means molded and embedded therein, such reinforcing means being formed of spaced metal plates and wires having portions extending longitudinally and transversely of the sheet and connecting the adjacent plates with each other and other portions projecting from the underside of the cover and providing mechanical fasteners for the cover.

4. The combination with a vehicle running board having a series of openings therethrough, a flexible cover adapted to extend over the running board comprising a sheet of rubber having reinforcing and attaching means molded and embedded therein, such reinforcing means being formed of spaced metal plates and wires extending longitudinally and transversely of the cover and connecting the plates and having portions projecting from the underside of the cover and adapted to extend through the opening of the running board for drawing the cover thereagainst.

BUDD BRONSON.